DIGITAL RECORDER WITH APPARATUS FOR VIEWING DURING THE RECORDING PROCESS
Filed May 22, 1967

INVENTOR
KARL BIRKEN
BY [signature]
ATTORNEY.

United States Patent Office 3,553,714

Patented Jan. 5, 1971

3,553,714

DIGITAL RECORDER WITH APPARATUS FOR VIEWING DURING THE RECORDING PROCESS

Karl Birken, 610 E. 20th St., New York, N.Y. 10009

Filed May 22, 1967, Ser. No. 639,991
Int. Cl. G01d 15/06, 15/08
U.S. Cl. 346—74 12 Claims

ABSTRACT OF THE DISCLOSURE

A recording medium comprising a thin conductive layer is placed in contact on one side thereof with a plurality of individually energizable conductive markers disposed in a two-dimensional matrix array which effect marks at the points of contact therebetween. Selective energization of the markers in accordance with an information pattern effects a series of marks representative of the information pattern. The invention is particularly characterized in that the markers are in a two-dimensional matrix array and that the recording medium is arranged so that the marks may be viewed while they are being produced from the side of the recording medium opposite the side in contact with the markers.

The present invention pertains to electrical recording apparatus and more particularly to a digital device for producing a physical representation of electronic data.

BACKGROUND OF THE INVENTION

With the advent of high speed electronic data processing equipment, a need develops for means providing a physical representation of data in terms which are intelligible for normal use. Computers are now utilized for processing data in a large number of diverse fields, but in each case the data to be processed must be converted into language which the computer or other processing mechanism can handle. In order for results to be readable, the data so processed must be subsequently transposed into normal language for appropriate utilization.

In some cases, which may not involve computer applications, some physical phenomenon must be observed and recorded. Normally, some form of electrical energy, such as pulses or the like, is adapted to provide a representation of the physical phenomenon, and the electrical energy, is then either applied to data processing equipment or to other appropriate apparatus, from which the electrical energy may be derived in a form suitable for application in equipment which produces a recorded indicia of the physical phenomenon involved.

In any event, it should be clear that recording apparatus will find utility in many applications, and that it is of particular importance to note that in so many modern applications of recording apparatus, there is a requirement for increasingly faster rates of converting data from its electrical form into an intelligible recording or plot.

Accordingly, a need develops for recorders which are simple in construction and operation while at the same time providing a reliably accurate record with sufficient speed to meet the requirements of modern applications.

A further capability of recording apparatus, which in many applications would provide significantly important advantages, is the ability to permit viewing of a record or plot simultaneously while it is being made. This would enable an operator or viewer to acquire a visual indication of the data being recorded without the necessity for waiting for a complete record to be made, or for removing the recording medium from the recorder or plotter in order to read the data involved. This capability would be particularly valuable in a situation where recording of some physical phenomenon was involved, such as the trajectory or speed of an object, since it would enable appraisal of data within a greatly shortened period of time.

In graphical recorders or plotters presently known, a severe shortcoming may exist due to the fact that in order to produce a record it is necessary to effect movement or travel of a physical mass, such as a stylus, a platen or the like. In such devices, the input must be utilized to activate some mechanical entity and thereby provide a response appropriately representative of the data to be recorded. It will be clear that the need for movement of a physical mass in such devices introduces an inherent shortcoming at least from the point of view of speed of operation due to the inertia of the mass which must be moved. Of course, other problems such as structural complexity and inaccuracy may arise, but these may or may not be inherent. However, the limit upon response time arising from the necessity for overcoming the inertia of a physical or mechanical mass will exist so long as the mass is an operative component of the device in question, and it will be clear that a significant advantage will be created if such response limitations can be overcome or eliminated. Furthermore, in such recorders there probably would not be provided the opportunity to view the recording process while it was being accomplished, without the necessity for removing the record from the recording device.

Accordingly, it is an object of the present invention to provide a recorder featuring simplicity and reliability of operation as well as improved response time.

It is a further object of the invention to provide a recorder overcoming the necessity for movement of a physical mass in the recording system thereby avoiding the inherent time delay due to the inertia of such mass.

Another object is to provide a recorder which permits viewing of data simultaneously while it is being recorded.

SUMMARY OF THE INVENTION

Briefly, the present invention comprises a recording medium which includes a thin layer of electrically conductive material, and a plurality of electrically conductive markers arranged in a two-dimensional matrix array adapted to be placed in contact with on side thereof, with energization of a marker being effective to mark the recording medium at the point of contact. A plurality of switch means individually energize the markers, and control of the switch means in accordance with an information pattern operates to produce the pattern on the recording medium. The recording medium is arranged in a manner whereby indicia produced upon the recording medium may be viewed from the side of the recording medium opposite the side in contact with the markers while it is being produced.

BRIEF DESCRIPTION OF THE DRAWING

A better understanding of the invention may be had from the following detailed description taken in connection with the accompanying drawing wherein.

DESCRIPTION OF THE PREFERRED EMBODIMENT

Figure 1:
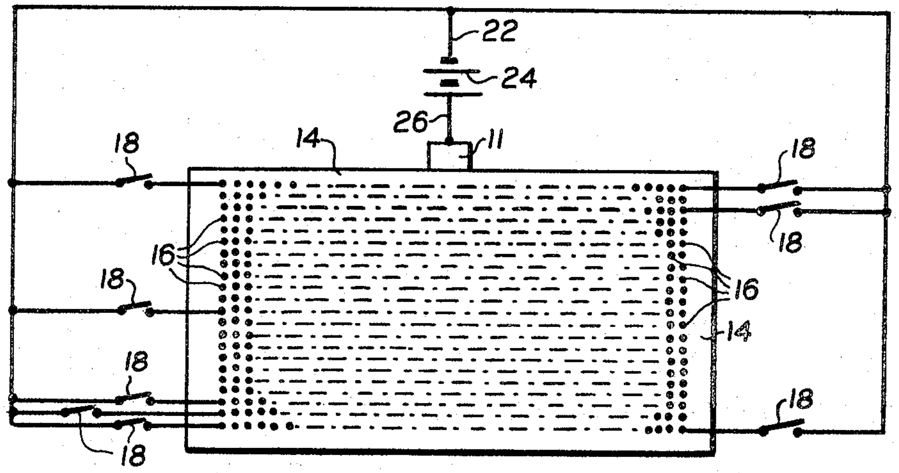
FIG. 1 is a rear view of a schematic representation of an embodiment exemplifying the principles of the invention.
Figure 2:
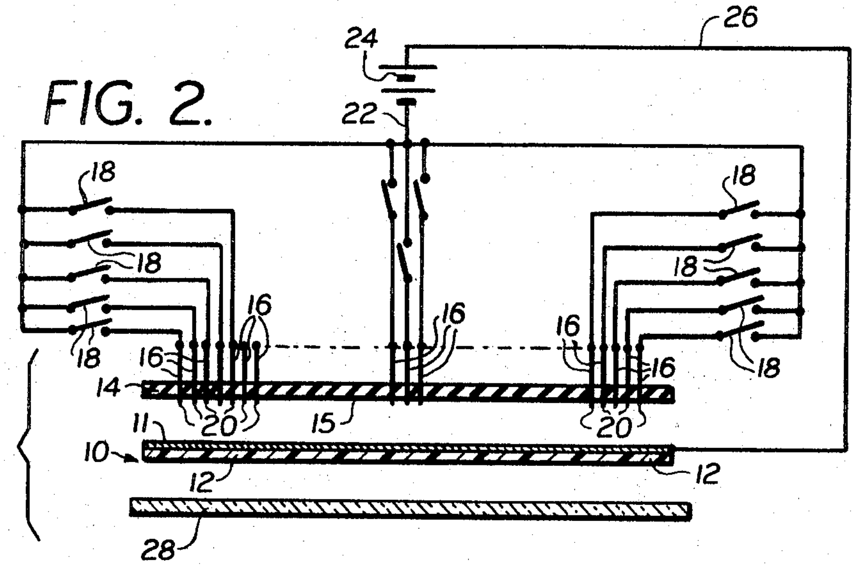
FIG. 2 is a top view of the embodiment of FIG. 1.

Referring to the drawing, there is shown a recording medium 10, upon which a plot or information pattern is to be effected, comprising a thin layer 11 of conductive material which is adhered to a transparent sheet 12.

Behind and adjacent recording medium 10 is a marker board 14 comprising insulating material and having mounted therein a plurality of electrically conductive markers 16 each of which is individually connected to a voltage source 24 through separate switch means 18. One side of voltage source 24 is connected to switch means 18 through a lead 22 and the opposite side is connected to conductive layer 11 through a lead 26.

In the operation of the recording device of the present invention, the recording medium 10 is placed in abutment with surface 15 of marker board 14. A transparent pressure plate 28, which may be composed of glass or any suitable transparent rigid material is utilized to hold recording medium 10 in place against marker board 14. The markers 16 essentially extend slightly beyond surface 15 in a manner to insure effective electrical contact between markers 16 and layer 11 when recording medium 10 is held between marker board 14 and pressure plate 28.

In order to produce a mark upon layer 11, the switch means 18, connected to the marker 16 which abuts the point on layer 11 where a mark is desired, is closed. Closing of switch means 18 completes a circuit from one side of voltage source 24, through a switch means 18 to a marker 16, and through the contact point between marker 16 and layer 11, and thereafter through layer 11 to lead 26 and back to the opposite side of source 24.

Although a description of the phenomenon whereby marking of layer 11 occurs when in electrical contact with marker 16 is not necessary for purposes of the present disclosure, to the extent that such a phenomenon is understood there is offered the following explanation, which is not to be construed in any limiting sense.

The current which passes through a closed switch means 18, a marker 16 and the layer 11, encounters its greatest resistance when it passes between marker 16 and layer 11 at the point of contact therebetween. This is seemingly due to the fact that marker 16 and layer 11 are not integrally joined, as by a soldered connection, and that they are only held together by being pressed into abutment. Accordingly, the amount of conductive material available through which current may pass is reduced since it would be only at those areas where the parts are in actual physical contact that a conductive path would exist. Since the amount of conductive material is reduced at the point of contact between marker 16 and layer 11, electrical resistance will be commensurately greater at this point. It is at this point of increased resistance that marking of layer 11 will occur, probably due to heat generated as a result of the increased resistance which operates to etch or singe the layer 11. The etching or singeing which occurs may operate to diminish or erode material from layer 11 and it is probably this diminution which gives rise to the effect of marking the recording medium.

The composition and thickness of layer 11 is such that the marking produced by markings produced by markers 16 will be visible from the side of layer 11 opposite the side in contact with markers 16. Due to the transparent nature of sheet 12 and plate 28, the markings produced will be visible to a viewer through both sheet 12 and plate 28.

The recording medium 10 is relatively thin and depending upon the materials used, it would be flexible to some degree. The sheet 12 is preferably of a clear plastic material, such as a resinous synthetic plastic or the like, and the layer 11 may comprise any suitable electrically conductive material, which may be any of a variety of metals, such as aluminum, nickel, etc. The layer 11 may be applied to sheet 12 by vacuum deposition, in a manner well known in the art, and the choice of material will be found to depend more upon physical and other considerations rather than upon operability within the concepts of the present invention, since there may be utilized almost any conductive material which can be applied in a layer thin enough that markings thereon may be produced by markers 16 in a manner consistent with the principles of the present invention.

Thus, it will be seen that the composite recording medium 10 comprises a thin conductive layer 11 capable of being marked as indicated, and a transparent sheet 12 to which the layer 11 is applied, the sheet 12 providing a required degree of rigidity and structural stability to the recording medium 10, in connection with the preferred embodiment described herein, without impairing the visibility therethrough of markings on layer 11.

The markers 16 may comprise any of a number of conductive materials, tungsten being an appropriate choice. Although in the drawing the markers 16 are shown in the form of slender pins or rods, it is to be understood that the physical configuration of the markers 16 is primarily significant from the point of view of mounting the markers in the marker board 14. From the viewpoint of operability within the concepts of the present invention it is merely necessary that the markers 16 be spaced relatively close together—the closeness required depending, within limits, upon the overall size of the recording medium 10 to be utilized—and that they be capable of being individually selectively energized. In terms of physical configuration, the markers 16 may comprise any shape appropriate for the intended purpose.

For example, the marker board 14 may comprise a configuration in the nature of a printed circuit board, formed of any insulating material normally used in such applications, with each marker 16 being embedded therein in a manner well known in the art of printed circuitry. The essential requirements of marker board 14 are that it comprise non-conductive material such that the markers 16 may be individually energized, and that the markers 16 be mounted so as to be capable of appropriately contacting layer 11.

Figure 3:
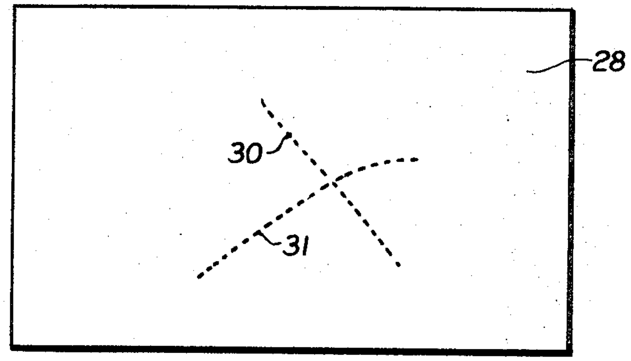
FIG. 3 is a front view of the embodiment, illustrating how the invention may be operated as a screen displaying a plot or other information pattern to be viewed while being recorded.

When it is desired to produce a recording or plot, such as the plots 30 and 31 illustrated in FIG. 3, it is merely necessary to selectively close the group of switch means 18 associated with points on the layer 11 which are coincident with points along the plot to be produced. It will be clear that each marker 16 corresponds with a particular point on layer 10. When it is desired to produce a mark at any such point, this may be accomplished by closing, for an appropriate period of time, and then opening, the switch means 18 connected to the marker 16 coincident with the point to be marked. Any plot or information pattern to be produced upon layer 11 will necessarily be made up of a particular pattern of these points. Thus, by selectively closing and then opening a specific group of switch means 18, a particular series or group of points will be produced, the grouping or arrangement of said series of points being appropriate to represent a particular information pattern or plot.

As described in connection with the preferred embodiment herein, the marks produced on layer 11 will be visible from the side opposite the side upon which markers 16 impinge. Thus, the marks produced, and the information pattern represented thereby, will be capable of being viewed through transparent plate 28 and transparent sheet 12. Additionally, plate 28 will be in the nature of a screen through which may be viewed the plot or information pattern simultaneously while it is being produced.

It will be apparent that if the series of point marks produced upon layer 11 are positioned sufficiently close together, they will define an information pattern which appears as a continuous line. In this regard, it should be understood that in a practical embodiment of the invention there may be provided any number of markers 16 depending upon the resolution or accuracy desired, and depending also upon the allowable over-all size and dimensions of the device. It will be clear that the larger the over-all size of the recording medium 10, the greater may be the spacing between markers 16, since on a larger recording medium wider spaced marks may more readily appear as a continuous information pattern. Of course, certain limitations with regard to the resolution obtainable and to the degree of closeness between individual conductors will be apparent, but this will depend primarily upon details of the structural configuration of an actual embodiment of the invention and upon the types of materials, e.g. insulating materials, used and the actual structural design of a unit.

Additionally, it should be understood that the switching system comprising switch means 18 and voltage source 24 is intended as exemplary, since different methods of providing the appropriate switching action to the markers 16 are possible within the purview of the invention. Many types of switch means are envisioned as within the scope of the invention and any device which could enable selective energization of markers 16 is intended. For example, the switch means 18 could comprise a relay-activated switch or a solid state electronic device such as a transistor or a silicon controlled rectifier. A selective factor in connection with the choice of switch means utilized may be the manner by which selective opening and closing thereof is to be controlled and the equipment utilized to effect this control. Of course, it will be clear that relays may introduce an undesirable delay factor and that solid state devices may be preferred. It will also be clear that the element, e.g. the base electrode of a transistor, used to control the opening and closing of the switch means must be compatible with the associated equipment providing the control. Depending upon the type of switch means utilized, and upon the information input controlling said switch means, it is conceivable that the opening and closing of a switch means 18 could occur almost instantaneously and hence, that all the points representing a specific information pattern could appear to a viewer as being produced simultaneously.

In one manner of operation envisioned, the switch means 18 may be controlled by a computer output. This output would have to be adapted so that it could be applied to the switch means 18 in an appropriate timed sequence to produce the information pattern desired. For example, information pattern contained in a computer in the form of a binary code, could be transposed and be made to appear upon the recording medium 10 in the form of alphanumeric characters by appropriate control of switch means 18. Of course, other applications not involving computers are possible, but in any case the form of the information pattern must be converted into a control pattern, e.g. a series of timed electrical pulses, appropriate for energizing markers 16 to produce the desired result. It will be clear that many such applications are possible and that there will be apparent to those skilled in the art many types of such devices utilizable with the present invention.

Of course, once a record has been completed the recording medium 10 may be removed from between board 14 and plate 28 and a new, unmarked recording medium may be inserted in its place for the production of another record.

From the foregoing, there has been provided a recording apparatus capable of operating at relatively high speed without time delay from inertia of a physical mass. No mechanical component, such as a stylus, need be moved, and the construction of a device in accordance with the principles described may be accomplished with improved economy and simplicity. Furthermore, the information which is to be produced by the apparatus may be viewed while in the process of being recorded without waiting for a record to be complete and without waiting for its removal from the recording device.

What is claimed is:

1. A digital recording device comprising a recording medium upon which indicia representing an information pattern is to be produced, said recording medium comprising a thin layer of electrically conductive material, a plurality of electrically conductive markers mounted to form a two-dimensional matrix array and adapted to be placed in contact with said recording medium over substantially the entire area of said recording medium where marks representing said information pattern are to be effected, a voltage source, and switch means adapted to be selectively closed and opened in accordance with said information pattern, whereby closure of said switch means completes an electrical circuit including said voltage source, said markers and said recording medium thereby effecting marking of said recording medium at points of contact of said markers with said recording medium, said recording medium being stationary during the time that said information pattern is being produced, said markings being visible from the side of said recording medium opposite the side in contact with said markers.

2. A recorder according to claim 1 wherein said recording medium comprises a transparent sheet having said thin electrically conductive layer adhered thereto.

3. A recorder according to claim 1 wherein said recording medium comprises a sheet of transparent synthetic plastic having adhered thereto a thin layer of a conductive metallic material.

4. A recorder according to claim 1 comprising rigid transparent support means movably positioned on the side of said recording medium opposite the side contacted by said markers, said support means being operative to assist in placing and holding said recording medium in contact with said markers while permitting viewing therethrough of markings produced upon said recording medium.

5. A recorder according to claim 1 wherein said markers are mounted upon a planar board comprising insulating material, said board arranged to be placed adjacent said recording medium, said markers arranged on said board to effect electrical contact with said recording medium.

6. A digital recording device comprising a recording medium upon which indicia representing an information pattern is to be produced, said recording medium comprising thin electrically conductive material, a plurality of electrically conductive markers arranged in a two-dimensional matrix array and adapted to be placed in contact with said recording medium over substantially the entire area of said recording medium where marks representing said information pattern are to be effected, means for selectively energizing said markers to effect marks on said recording medium at said points of contact, means for maintaining said recording medium stationary and in contact with said markers while said information pattern is being produced, and means enabling viewing of said marks from the side of said recording medium opposite the side in contact with said markers at the time they are effected.

7. A recorder according to claim 6 comprising switch means singularly operative to individually energize each of said markers, said switch means being responsive to means for effecting said marks on said recording medium in accordance with an information pattern to be represented.

8. A recorder according to claim 6 wherein said marks are visible from the side of said recording medium opposite the side in contact with said markers.

9. A recorder according to claim 6 wherein said markers are provided on one side only of said recording medium.

10. A recorder according to claim 6 wherein said recording medium and said markers are held firmly together in a fixed position relative to each other, there being a number of markers to effect a two-dimensional information pattern on said recording medium while being so held.

11. A recorder according to claim 6 wherein said markers are arranged in said two-dimensional matrix array in a plane parallel to said recording medium.

12. A digital recording device acocrding to claim 6 comprising means forming an electrical current path including said recording medium and selected ones of said markers.

References Cited

UNITED STATES PATENTS

| | | | |
|---|---|---|---|
| 2,730,694 | 1/1956 | Williamson | 346—74 |
| 2,858,181 | 10/1958 | Ortlieb | 346—74 |
| 2,918,608 | 12/1959 | Rieth | 346—74 |
| 2,971,810 | 2/1961 | Ressler | 346—74 |
| 3,214,764 | 10/1965 | Williams | 346—74 |

BERNARD KONICK, Primary Examiner

G. M. HOFFMAN, Assistant Examiner